Feb. 23, 1960          R. L. LICH          2,925,790

RAILWAY VEHICLE TRUCK

Filed Jan. 8, 1958          4 Sheets-Sheet 1

FIG. 1

INVENTOR.
RICHARD L. LICH
BY
*Francis T. Burgess*
ATTORNEY

Feb. 23, 1960 R. L. LICH 2,925,790
RAILWAY VEHICLE TRUCK
Filed Jan. 8, 1958 4 Sheets-Sheet 2

INVENTOR.
RICHARD L. LICH
BY
Francis T. Burgess
ATTORNEY

Feb. 23, 1960     R. L. LICH     2,925,790
RAILWAY VEHICLE TRUCK
Filed Jan. 8, 1958     4 Sheets-Sheet 4

INVENTOR.
RICHARD L. LICH
BY Francis T. Burgess
ATTORNEY

United States Patent Office 2,925,790
Patented Feb. 23, 1960

2,925,790

RAILWAY VEHICLE TRUCK

Richard L. Lich, Ferguson, Mo., assignor to General Steel Castings Corporation, Granite City, Ill., a corporation of Delaware Application January 8, 1958, Serial No. 707,747

13 Claims. (Cl. 105—194)

The invention relates to railway rolling stock and consists particularly in car trucks having separate relatively movable side frames.

Most conventional passenger car trucks include an equalizer beam at each side supported on the ends of the axles, and a rigid frame spring-supported on the equalizer beams intermediate the axles, the frame serving to keep the axles in tram and to support, usually by means of laterally swingable links and a second spring system, a laterally movable bolster on which the car body, including heavy transverse body bolster, is pivotally supported, the body bolster serving to transmit the load from the loaded vehicle side walls to the truck center plates.

It is a main object of the invention to provide a simple, light, and inexpensive four-wheel passenger car truck having good riding qualities and the durability and safety of conventional trucks.

It is a further object to provide a passenger car truck in which the functions of the equalizers and truck frame are combined, and which makes the usual heavy body bolster unnecessary.

It is a further object to provide a truck comprising a center transom, side frames pivotally secured to the center transom for angular movement thereabout in their respective longitudinal vertical planes, a bolster pivotally supported on the transom for pivotal movement about a vertical axis at the center of the transom, springs on the ends of the bolster for supporting the body for both vertical and lateral movements on the bolster, and means connecting the bolster and the body underframe for preventing movements of the bolster and transom relative to the body about vertical or transverse horizontal axes without interfering with lateral and vertical movement of the body on its supporting springs relative to the bolster.

These and other objects of the invention will be apparent to those skilled in the art from a study of the following description and the accompanying drawings, in which:

Figure 1 is a plan view of a four-wheel motor truck embodying the invention.

Figures 2, 3, 4, 5:
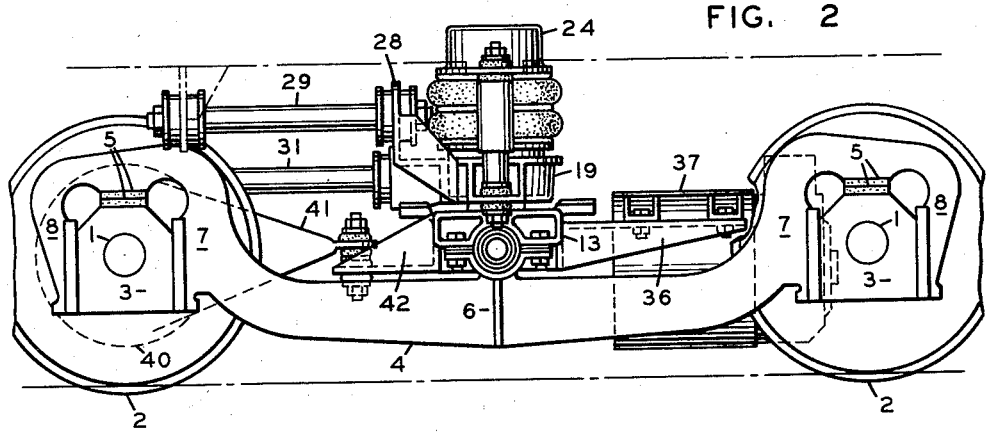
Figure 2 is a side elevational view of the same truck.
Figure 3 is a transverse vertical sectional view along the line 3—3 of Figure 1.
Figure 4 is a fragmentary plan view of a modified bolster arrangement.
Figure 5 is a longitudinal vertical sectional view along the line 5—5 of Figure 4.
Figure 6:
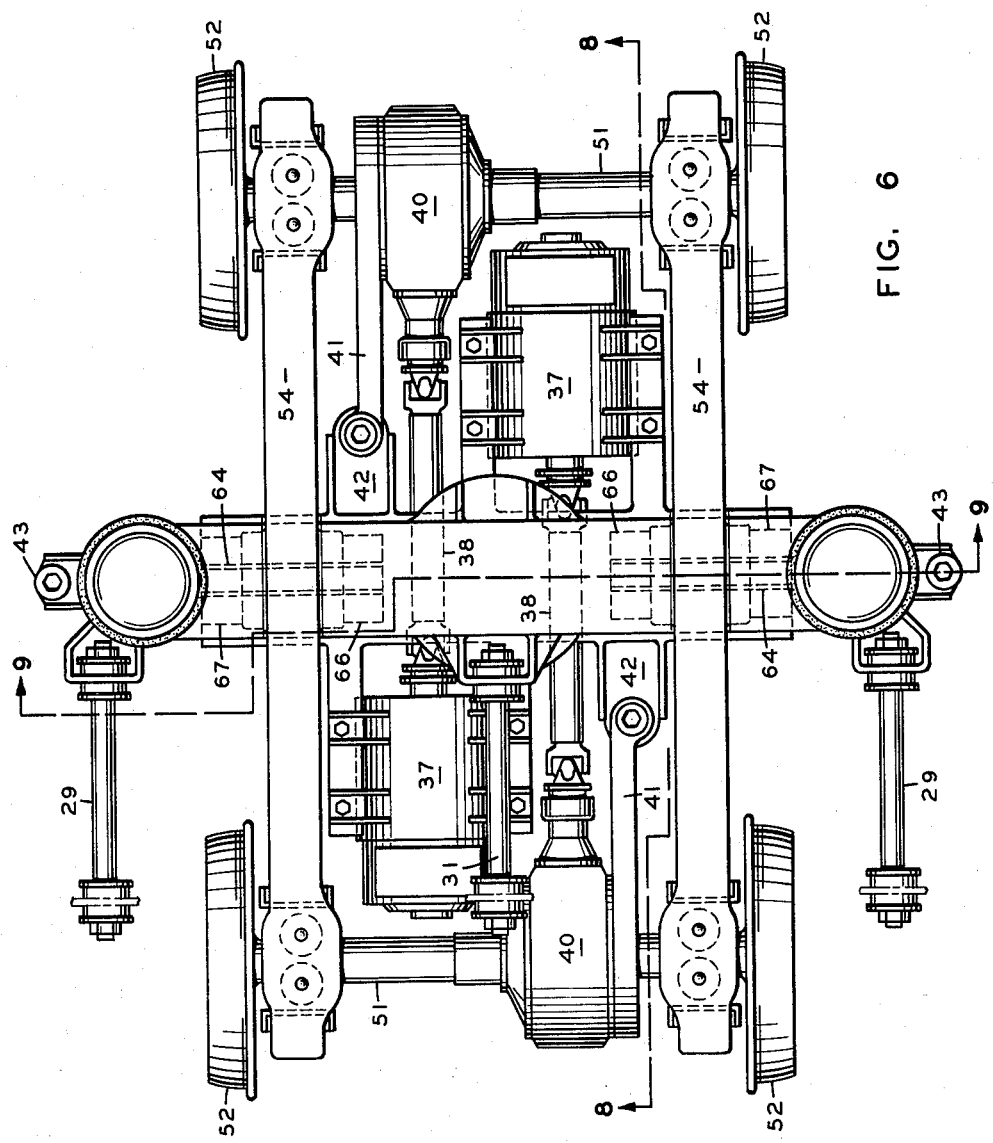
Figure 6 is a plan view of a second embodiment of the invention.
Figure 7:
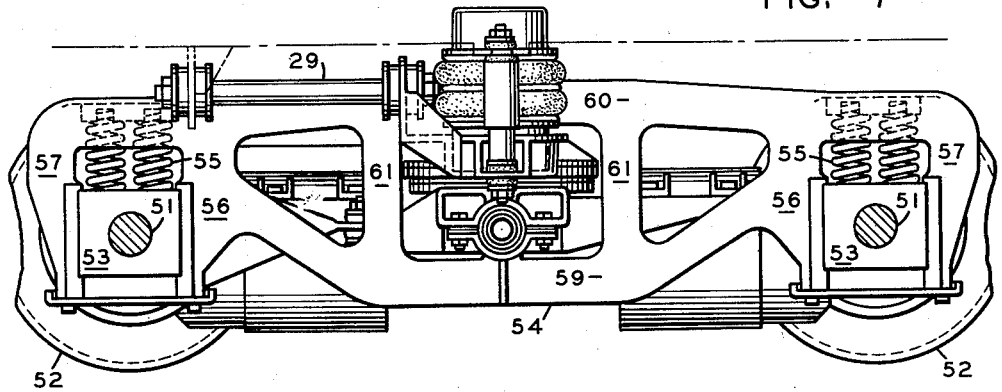
Figure 7 is a side elevation view of the truck illustrated in Figure 6.
Figure 8:
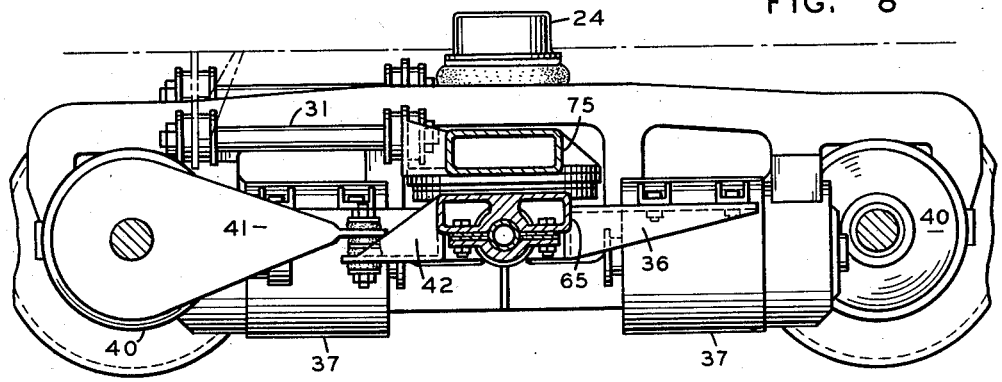
Figure 8 is a longitudinal vertical sectional view along the line 8—8 of Figure 6.
Figure 9:
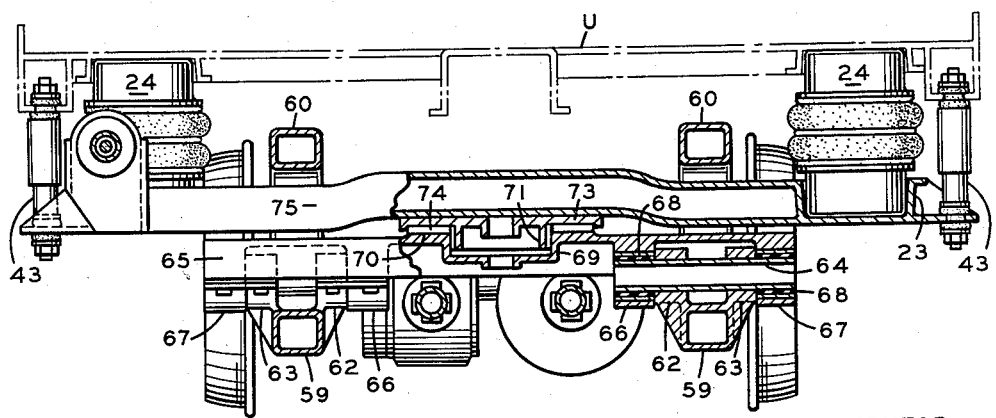
Figure 9 is a transverse vertical sectional view along the line 9—9 of Figure 6.

Referring to the drawings, the truck shown in Figures 1-3 comprises the usual axles 1, flanged wheels 2 mounted thereon, journal boxes 3 rotatably mounted on the ends of axles 1, and a pair of longitudinally-extending side frames 4, each supported at its ends on journal boxes 3 by means of two-layer rubber sandwiches 5. Each of the side frames 4 comprises a longitudinally extending beam portion 6 at a lower level than the axles and merging pedestals each comprising a pair of longitudinally spaced vertical legs 7 and 8, between which journal boxes 3 are vertically slidably received; the rubber cushions 5 accommodate slight movements of the boxes in the pedestals and provide cushioned support for the side frames 4. Midway between the axles, side frames 4 are each formed with upstanding, laterally-spaced, transversely aligned brackets 10 and 11, extending, respectively, outwardly and inwardly of the side frame, and rigidly supporting a transversely extending tubular member 12, the ends of which extend transversely inwardly and outwardly from brackets 10 and 11. For tying the side frames 5 together transversely of the truck, and retaining them at all times in parallel vertical planes, a transom member 13 is provided at its ends with spaced depending cylindrical clamping elements 14, by means of which it is clamped to the ends of tubular members 12. Rubber bushings 15 are interposed between clamping elements 14 and tubular members 12 to accommodate slight pivotal movements therebetween.

Transom 13 is provided at its center with an upstanding cylindrical element 16, and is also provided intermediate its ends with a pair of laterally spaced upwardly-facing bearing surfaces 17, 17. A bolster 19, of box section, is provided with mating downwardly facing bearing members 20, 20 and is supported thereby on transom 13, upstanding cylindrical element 16 of transom 13 being pivotally received in a central cylindrical recess 22 in bolster 19, so that bolster 19 is free to pivot about the members 16, 22 and is supported on transom 13 by the mating sliding bearings 17, 20; it will be noted that the spacing of bearings 17, 20 from the pivotal axis may be such that the moment of the frictional resistance between the bearings will be sufficient to resist shimmy of the truck about its pivotal axis while at the same time not providing sufficient resistance to interfere with normal swiveling movements of the truck due to curvature of the track. The bearings 17 and 20 are elongated lengthwise of the truck and transversely of the bolster and transom so as to remain in full contact throughout maximum swiveling movements of the truck and thus maintain the bolster and transom parallel at all times.

Outboard of the wheels, each end of the bolster 19 is recessed as at 23 to form a seat for an axially and transversely distortable air spring 24, which may be of the types described and claimed in my co-pending application Serial No. 688,492, filed October 7, 1957. A vehicle underframe U including cup-like spring caps 26 seated on springs 24, 24, is movable transversely and vertically of bolster 24. For preventing relative swiveling movements between the bolster and the vehicle underframe and for preventing tilting movements of the bolster and transom about the pivotal mountings of the transom on the side frames, the bolster is provided at each of its ends with an upstanding bracket 28 to which is resiliently secured a longitudinally extending link 29, of the type described in Re. 21,987, the other end of link 29 being similarly secured to a bracket 30 depending from underframe U. On the longitudinal center line of the truck a similar link 31 connects a central bolster bracket 32 to a depending body bracket 33. Thus, it will be seen that by virtue of the lateral spacing of the longitudinally extending links 29 and 31, all longitudinal movements of the bolster relative to the frame will be prevented, and by means of the vertical spacing between links 29, 29 and center link 31, tilting movements of the bolster about an axis extending transversely of the car body will be similarly prevented, without interference with vertical and lateral movements of the underframe relative to the bolster.

A pair of longitudinally extending brackets 35 and 36 on the opposite sides of the transom support longitudinally extending traction motors 37, which are connected by the usual universally-jointed shafts 38 to axle mounted gear boxes 40, the torque arms 41 of which are supported on additional brackets 42 extending longitudinally from opposite sides of the transom. The ends of bolster 19 are connected by conventional friction snubbing devices 43 to brackets on underframe U for the purpose of snubbing the action of air springs 24.

During operation of the truck and underframe arrangement described above, vertical irregularities in the rails will cause upward or downward movement of the ends of the side frames 4, which are free to tilt relative to each other in their respective longitudinal vertical planes and thus the transmission of such shocks to the body-supporting structure including the transom and bolster is minimized. By virtue of the links 29, 29, and 31 connecting the bolster to the underframe, the bolster is at all times stabilized against swiveling or tilting relative to the body, and through the elongation of the side bearings 17, 20, this stability of the bolster is transmitted to the transom, notwithstanding tilting movements of the side frames. By spacing the body-supporting springs 24 as far apart transversely of the car as clearance limitations will permit, and thus supporting the body near its load bearing side walls instead of on its longitudinal center line as with conventional trucks, vertical bending moments on the body bolster are substantially reduced, thus permitting the use of a much lighter body bolster than in conventional equipment.

Figures 4 and 5 illustrate a substitute for central anchor 31, which comprises a pair of brackets 45 depending from the vehicle underframe U on either side of the bolster, and multi-layer rubber sandwich devices 46 each having one vertical surface secured to one of the brackets 45 and the opposite vertical surface secured to the adjacent face of the bolster 19'. Sandwiches 46 through yieldability in shear will permit lateral and vertical movements of the bolster as are accommodated by the springs 24, but through their resistance to compression will prevent any substantial longitudinal movement of the center part of the bolster and thus will cooperate with side links 29 to prevent tilting of the bolster about a transverse axis.

Referring to Figures 6 through 9 the truck illustrated therein includes the usual axles 51, flanged wheels 52 rigidly mounted on the ends of axles 51, journal boxes 53 rotatably mounted on axles 51 inboard of wheels 52, and side frames 54 which are supported by springs 55 on journal boxes 53. Side frames 54 each include a pair of spaced pedestal legs 56 and 57 at each end and between each pair of legs 56, 57 journal boxes 53 are vertically slidably received. The inner pedestal legs 57 at each end of the truck are connected by a truss comprising bottom chord 59, top chord 60, and longitudinally spaced vertical columns 61. Intermediate columns 61, bottom chord 59 is provided with a pair of upstanding inwardly and outwardly extending transversely aligned brackets 62 and 63, to each pair of which is rigidly secured a transversely extending tube 64. A transom 65 extends between the side members 54 and is provided at each end with depending laterally spaced clamp elements 66 and 67, by means of which it is clamped to the ends of tubes 64, there being cylindrical rubber bushings 68 between clamps 66 and tubes 64 for permitting slight pivotal movement between side frames 54 and transom 65. At its center, transom 65 is provided with a lower central bearing member of the type described in Patent No. 2,655,117, including a vertically disposed cylindrical recess 69 surrounded by an upwardly facing horizontal annular surface 70. A cooperating upper central bearing member comprising a downwardly extending cylindrical projection 71 pivotally received within recess 69, and a surrounding horizontal annulus 73 supported by means of an annular friction disk 74 on surface 70 is provided. A bolster 75 is rigidly mounted on upper member 71, 73, and accordingly is free to pivot about a central vertical axis relative to transom 65, the frictional resistance offered by friction element 74 being sufficient to dampen oscillations of the bolster relative to the transom about the vertical pivotal axis, but being sufficiently low to accommodate swiveling movements of the transom and truck structure relative to the bolster necessitated by track curvature. Bolster 75 extends transversely of the truck through the openings formed by bottom chord 59, top chord 60, and columns 61, 61 of each of the side frames and is provided outboard of the wheels with seats 23 for springs 24, the mounting of the underframe U on the bolster being as described in connection with the first form of the invention.

The motors, gear boxes, and torque arms are similarly mounted from the transom.

The details of the structure may be varied substantially without departing from the spirit of the invention and the exclusive use of those modifications as come within the scope of the appended claims is contemplated.

What is claimed is:

1. A railway vehicle truck comprising wheels, axles, longitudinally extending side frames supported on the end portions of said axles, a transversely extending transom pivotally supported on said side frames intermediate said axles on an axis extending transversely of the truck, said side frames being pivotal relative to each other about said axis, a transversely extending bolster pivotally supported on said transom on a vertical axis substantially at the center of said transom, upright springs on the ends of the bolster adapted to support a vehicle body thereon for both vertical and lateral movements relative thereto, and at least three laterally and vertically spaced draft transmitting devices connected to the bolster and adapted for connection to a supported vehicle body for preventing relative movements between the bolster and the vehicle body about vertical or transverse horizontal axes.

2. A railway vehicle truck according to claim 1 in which the side frames are resiliently supported from the axles.

3. A railway vehicle truck according to claim 1 in which two of said devices are connected at a relatively high level to the end portions of said bolster and the third device is connected at a relatively low level to the center portion of said bolster.

4. A railway vehicle truck according to claim 1 in which the transom is provided with a pair of longitudinally extending brackets on its one side and a single bracket at its other side, there being a motor suspended from said pair of brackets, an axle-mounted driving gear box having a torque arm supported on said single bracket, and a shaft connecting said motor and said gear box.

5. A railway vehicle truck according to claim 1 in which each of said devices is a longitudinally extending link pivotally connected at one end to said bolster and adapted for pivotal connection at the other end to a vehicle underframe.

6. A railway vehicle truck according to claim 1 in which one of said devices comprises a pair of flat rubber-like pad devices each secured at one side to each vertical side of the bolster and adapted to be secured at their other side to a transverse vertical surface of structure associated with the vehicle underframe, said pads being yieldable in shear vertically and transversely of the truck whereby to accommodate both vertical and transverse movements of the bolster through yieldability in shear while resisting longitudinal movements of the bolster through resistance of the rubber pads to compression.

7. A railway vehicle truck according to claim 1 in which the supports for the bolster on the transom comprise opposing horizontal bearing surfaces on the bolster and transom respectively, said bearing surfaces being elongated longitudinally of the truck whereby to resist tendencies of the transom to rotate about an axis extending transversely of the truck.

8. A railway vehicle truck according to claim 1 in which said side frames include a pair of pedestal jaws spaced apart longitudinally, and a truss-like structure connecting said pedestal jaws, said truss-like structure comprising top and bottom chords spaced apart vertically by a pair of longitudinally spaced upright columns, said bottom chords including a transverse pivot for said transom, and said bolster extending transversely of the truck through the windows in said side frames formed by said top and bottom chords and said columns, said springs being supported on said bolster outboard of said side frames.

9. A railway vehicle truck according to claim 1 in which the side frames include a pair of pedestal jaws at their ends and a longitudinally extending beam connecting said pedestal jaws at a lower level than said axles.

10. A railway vehicle truck according to claim 9 in which said side frames are positioned inboard of said wheels.

11. A railway vehicle truck according to claim 1 in which the pivotal supports for said transom on said side frames are elongated transversely of said truck whereby to maintain the general longitudinal vertical planes of said side frames constantly perpendicular to the transom.

12. A railway vehicle truck according to claim 11 in which the resilient supports of the side frames from the axles consist of rubber pads.

13. A railway vehicle truck according to claim 11 in which the resilient supports of the side frames from the axles comprise coil springs.

References Cited in the file of this patent

UNITED STATES PATENTS

| | | |
|---|---|---|
| 816,294 | Brill et al. | Mar. 27, 1906 |
| 2,011,918 | Stedefeld et al. | Aug. 20, 1935 |
| 2,219,360 | Green | Oct. 29, 1940 |
| 2,267,589 | Eksergian | Dec. 23, 1941 |
| 2,766,703 | Cooke | Oct. 16, 1956 |

FOREIGN PATENTS

| | | |
|---|---|---|
| 427,884 | Great Britain | Apr. 30, 1935 |